United States Patent
Sullivan et al.

(10) Patent No.: US 9,944,413 B2
(45) Date of Patent: Apr. 17, 2018

(54) CIRCUITS AND METHODS FOR REDUCING FLICKER IN AN LED LIGHT SOURCE

(71) Applicant: TEXAS INSTRUMENTS INCORPORATED, Dallas, TX (US)

(72) Inventors: Timothy Roy Sullivan, Longmont, CO (US); Daniel Ross Herrington, Fort Collins, CO (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/793,276

(22) Filed: Oct. 25, 2017

(65) Prior Publication Data

US 2018/0044040 A1    Feb. 15, 2018

Related U.S. Application Data

(60) Division of application No. 14/798,126, filed on Jul. 13, 2015, now Pat. No. 9,832,828, which is a
(Continued)

(51) Int. Cl.
| | |
|---|---|
| *H05B 33/08* | (2006.01) |
| *B64G 1/22* | (2006.01) |
| *B64G 1/44* | (2006.01) |
| *B64G 1/66* | (2006.01) |
| *H02S 30/20* | (2014.01) |
| *H01Q 1/28* | (2006.01) |

(Continued)

(52) U.S. Cl.
CPC ............... *B64G 1/222* (2013.01); *B64G 1/44* (2013.01); *B64G 1/66* (2013.01); *H01Q 1/08* (2013.01); *H01Q 1/288* (2013.01); *H01Q 15/161* (2013.01); *H02S 30/20* (2014.12); *H05B 33/0815* (2013.01); *H05B 33/0845* (2013.01)

(58) Field of Classification Search
CPC .................... H05B 33/0815; H05B 33/0845
See application file for complete search history.

(56) References Cited

U.S. PATENT DOCUMENTS

| | | |
|---|---|---|
| 7,902,769 B2 | 3/2011 | Shteynberg et al. |
| 8,513,894 B2 | 8/2013 | Huang et al. |

(Continued)

FOREIGN PATENT DOCUMENTS

| | | |
|---|---|---|
| CN | 201207961 A | 6/2008 |
| CN | 101909391 A | 12/2010 |

(Continued)

OTHER PUBLICATIONS

Search Report, dated Sep. 8, 2017.

(Continued)

*Primary Examiner* — Douglas W Owens
*Assistant Examiner* — Pedro C Fernandez
(74) *Attorney, Agent, or Firm* — Lawrence J. Bassuk; Charles A. Brill; Frank D. Cimino

(57) ABSTRACT

Method and circuits for balancing a first waveform used to drive an LED are disclosed herein. The first waveform has a first cycle with a first amplitude and a second cycle with a second amplitude. An embodiment of the method includes adjusting the first amplitude of the first cycle to match the second amplitude of the second cycle, the result being a second waveform. The LED is driven with the second waveform.

11 Claims, 3 Drawing Sheets

Related U.S. Application Data continuation of application No. 13/667,964, filed on Nov. 2, 2012, now Pat. No. 9,084,319.

(51) Int. Cl.
*H01Q 15/16* (2006.01)
*H01Q 1/08* (2006.01)

(56) References Cited

U.S. PATENT DOCUMENTS

| | | | |
|---|---|---|---|
| 8,791,653 B2 | 7/2014 | Wendt | |
| 2005/0237005 A1* | 10/2005 | Maxik | H05B 33/0818 315/247 |
| 2009/0184662 A1* | 7/2009 | Given | H05B 33/0815 315/294 |
| 2010/0295460 A1 | 11/2010 | Lin et al. | |
| 2011/0227489 A1 | 9/2011 | Huynh | |
| 2012/0146525 A1 | 6/2012 | Hui et al. | |
| 2012/0153833 A1 | 6/2012 | Mikani et al. | |
| 2012/0153836 A1 | 6/2012 | Shimizu | |
| 2013/0154487 A1 | 6/2013 | Kuang et al. | |
| 2013/0334980 A1 | 12/2013 | Zhou et al. | |
| 2014/0009085 A1 | 1/2014 | Veskovic | |
| 2014/0125239 A1 | 5/2014 | Sullivan et al. | |
| 2014/0159595 A1 | 6/2014 | Sutardja et al. | |
| 2014/0203734 A1 | 7/2014 | Wendt | |
| 2014/0210352 A1 | 7/2014 | Grajcar | |
| 2014/0217907 A1 | 8/2014 | Harris | |
| 2014/0232289 A1 | 8/2014 | Brandes et al. | |
| 2014/0300289 A1 | 10/2014 | Zhu | |
| 2014/0354170 A1 | 12/2014 | Gredler et al. | |
| 2014/0368119 A1 | 12/2014 | Lee et al. | |
| 2014/0368126 A1 | 12/2014 | Nakagawa et al. | |
| 2014/0368130 A1 | 12/2014 | Catalano et al. | |
| 2015/0002036 A1 | 1/2015 | Sun et al. | |
| 2015/0002038 A1 | 1/2015 | Wan et al. | |

FOREIGN PATENT DOCUMENTS

| | | |
|---|---|---|
| CN | 102143638 A | 8/2011 |
| JP | 2010272840 A | 12/2010 |
| JP | 2011510475 A | 3/2011 |
| JP | 2011522358 A | 7/2011 |
| JP | 2012109266 A | 6/2012 |
| JP | 2012134001 A | 7/2012 |
| WO | WO2012061769 A2 | 5/2012 |

OTHER PUBLICATIONS

Chinese Office Action dated Jun. 27, 2016 (4 pages).
PCT Search Report for PCT/US13/68288, dated Feb. 6, 2014 (1 page).

* cited by examiner

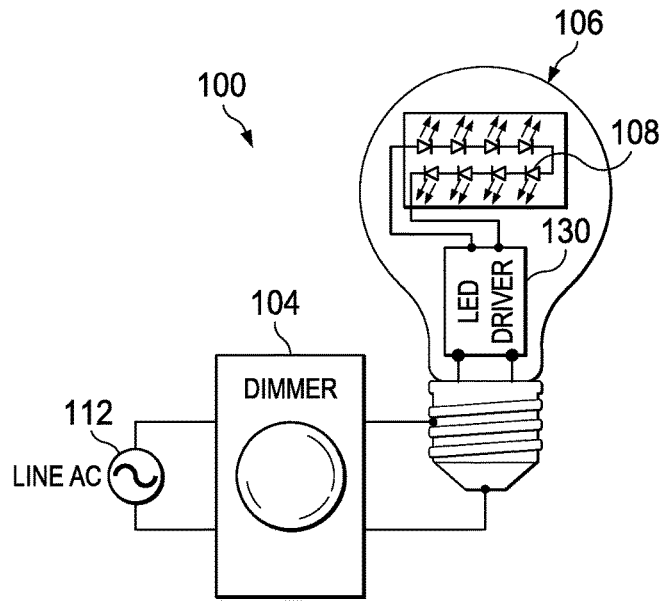
FIG. 1
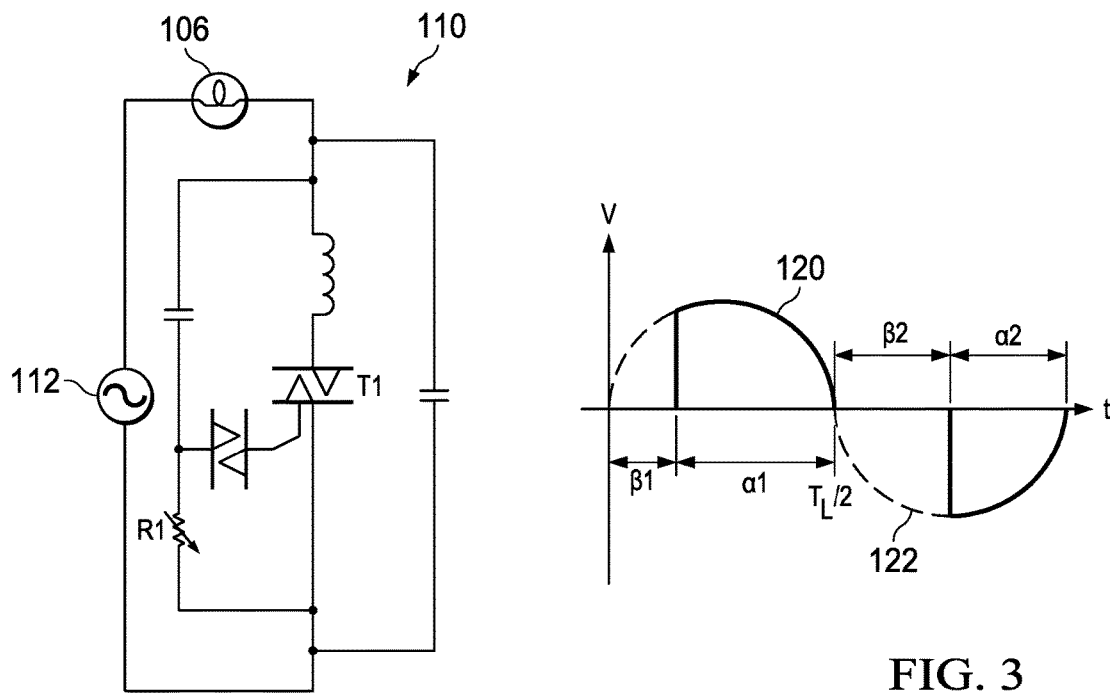
FIG. 2
FIG. 3

CIRCUITS AND METHODS FOR REDUCING FLICKER IN AN LED LIGHT SOURCE

This application is a Divisional of prior application Ser. No. 14/798,126, filed Jul. 13, 2015, now U.S. Pat. No. 9,832,828, issued Nov. 28, 2017;

Which was a Continuation of prior application Ser. No. 13/667,964, filed Nov. 2, 2012, now U.S. Pat. No. 9,084,319, granted Jul. 14, 2015, which is hereby incorporated by reference for all purposes.

BACKGROUND

Some people are replacing incandescent light bulbs with LED bulbs. The LED bulbs are direct replacements for incandescent lights, so a user simply unscrews an incandescent bulb from a socket and replaces it with an LED bulb. Many incandescent bulbs are operated by the use of a dimmer that controls the intensity of light emitted by an incandescent bulb. Most dimmers work by clipping the AC line voltage supplied to the incandescent bulb by the use of a triac. For example, the dimmer clips the positive and negative portions of the AC sinusoidal wave that is supplying power to the incandescent bulb. Because of the construction and inherent operating principles of the triac, the positive and negative portions of the AC voltage that are clipped by the triac are not equal.

The intensity of light emitted by an incandescent and an LED bulb is proportional to the current driving the bulb. Therefore, when the positive and negative portions of the sinusoidal wave driving the bulbs is clipped differently, the driving current will have a ripple. Incandescent lights have a very long time constant, meaning that they will glow for a period after power is removed. Therefore, a user is not likely to notice the inherent ripple of a dimmed incandescent light bulb. However, LEDs emit light based on current flow through a P-N junction and therefore do not glow or have a very short period in which they glow. As a consequence, the difference in conduction angles caused by the triac causes a noticeable and unpleasant flicker.

SUMMARY

Method and circuits for balancing a first waveform used to drive an LED are disclosed herein. The first waveform has a first cycle with a first amplitude and a second cycle with a second amplitude. An embodiment of the method includes adjusting the first amplitude of the first cycle to match the second amplitude of the second cycle, the result being a second waveform. The LED is driven with the second waveform.

BRIEF DESCRIPTION OF THE DRAWINGS

FIG. 1 is a schematic illustration of an LED lighting system using a dimmer.

FIG. 2 is a schematic illustration of an embodiment of the circuit within the dimmer of FIG. 1.

FIG. 3 is a graph depicting the voltage to the bulb of FIG. 1 as the dimmer is activated.

DETAILED DESCRIPTION

Figure 4:
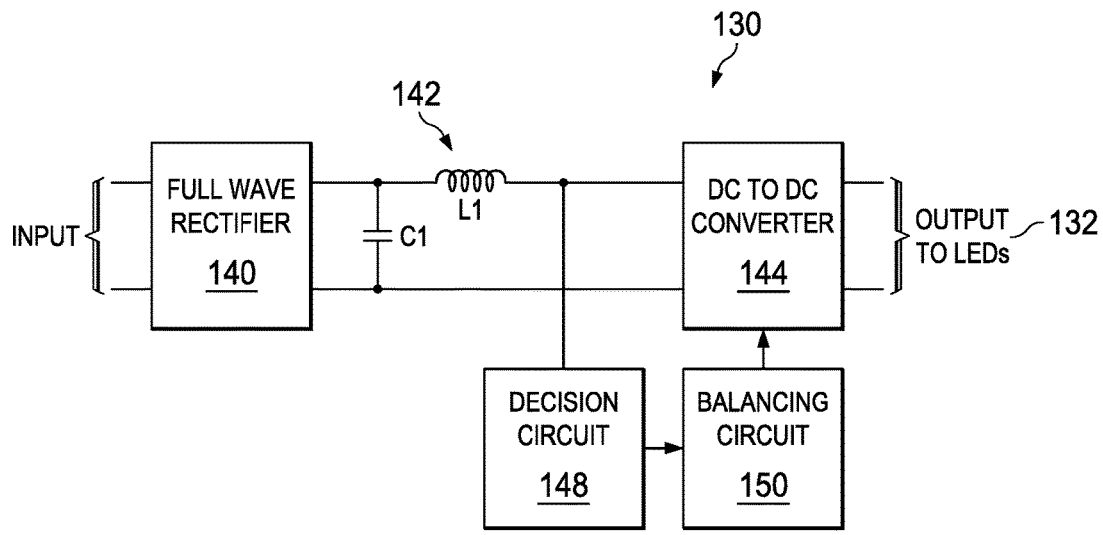
FIG. 4 is a block diagram of an embodiment of the LED driver of FIG. 1.

Circuits and methods that balance LED (light-emitting diode) driving currents are disclosed herein. Reference is made to FIG. 1, which is a schematic diagram of an LED lighting system 100 using a dimmer 104. The dimmer 104 is used to dim a solid state light (SSL) bulb 106. In the embodiments described herein, the SSL bulb 106 is an LED bulb, wherein the source of light emitted by the bulb 106 is generated by LEDs 108. LED bulbs differ somewhat from incandescent light bulbs that get hot and glow, even for a short period after power is removed from the incandescent bulbs. LEDs, on the other hand, use a P-N junction to emit light, which stops instantaneously upon removal of the power source to the LEDs. Therefore, the LED bulbs have a much shorter time constant than incandescent bulbs, which makes them difficult to dim. More specifically, the very short time constants make the LEDs sensitive to their driving currents. For example, a ripple in the driving current may cause a flicker that is noticeable by a user, wherein the same ripple driving an incandescent bulb does not produce a noticeable flicker.

Most users of LED bulbs want to simply replace an incandescent bulb with an LED bulb and use an existing dimmer that was used with the incandescent bulb. However, these dimmers were typically made for devices such as incandescent bulbs or ceiling fans that are not susceptible to small ripple currents and therefore the output currents of these dimmers have some imbalance between the positive and negative portions of their output sinusoid signals. This imbalance may cause flicker in the light emitted by the LED bulbs, which may be noticeable. The circuits and methods described herein reduce the effects of the imbalance caused by the dimmer 104, which reduces the flicker in the light emitted by the bulb 106.

Additional reference is made to FIG. 2, which is a schematic diagram of an embodiment of a circuit 110 located within the dimmer 104. The circuit 110 is a conventional dimming circuit that uses a triac T1 for dimming purposes. It is noted that the dimmer 104, and thus the circuit 110 are connected in series with the bulb 106 and an AC line voltage source 112 (referred to herein as the line voltage 112). The line voltage 112, for example, may be 110v at 60 Hz. The triac T1 acts like a switch and closes the circuit 100 during portions of the sinusoidal line voltage 112. A variable resistor R1 determines the voltage at which the triac T1 closes, which is sometimes referred to as the firing angle. By adjusting the variable resistor R1, the conduction angle of the circuit 100 can be varied, which varies the voltage and current flow to the bulb 106. There are many different dimmer circuits, but they produce the same outcome of opening and closing the circuit 100 during specific periods of the sinusoidal line voltage.

The conduction angle is shown by the graph of FIG. 3, which is an example of the current flow through the circuit 100. The line voltage 112 supplies an AC sinusoidal voltage shown by the solid and dashed lines of FIG. 3. For reference, one cycle of the sinusoidal voltage is shown and has a positive phase 120 of 180 degrees and a negative phase 122 of 180 degrees. The triac T1 in the circuit 110 prevents current from flowing through the circuit 110, and thus, the bulb 106, until the voltage has reached a specific level determined by the variable resistor R1. By stopping the current flow at different angles, the circuit 110 maintains an AC current to the bulb 106, but the amount of current varies.

An example of the voltage supplied to the bulb 106 is shown by the solid line in FIG. 3, which may also described the current supplied to the bulb 106. During the positive phase 120, current flows through the bulb 104 during a period of a conduction angle α1. Current does not flow during an off period represented by an angle β1. It is noted that sum of the angles α1 and β1 add up to the positive phase 120 of 180 degrees. During the negative phase 122, current flows through the bulb 104 during a period of a conduction angle α2. Current does not flow during an off period represented by an angle of β2. The sum of the angles α2 and β2 add to the negative phase 122 of 180 degrees. In the embodiments described herein, the conduction angle α1 is not necessarily equal to the conduction angle α2. The unequal conduction angles α2, β2 represent the imbalance described above.

Referring again to FIG. 1, an LED driver 130 within the bulb 106 uses the voltage shown in FIG. 3 to drive the LEDs 108 within the bulb 106. A block diagram of an embodiment of the LED driver 130 is shown in FIG. 4. Several elements of the LED driver 130 are described as being individual circuits. It is noted that they all or some of them may be located on a single circuit. The LED driver 130 has an input that is connectable to the circuit 100. The input is connected to a full wave rectifier 140. The full wave rectifier 140 has an output that may be connected to a filter 142 consisting of a capacitor C1 and an inductor L1. It is noted that the filter 142 may be any number and configuration of components that smooth the output of the full wave rectifier 140. In some embodiments, the filter 142 is not used.

The output of the filter 142 is connected to both a DC to DC converter 144 and a decision circuit 148. The DC to DC converter 144 receives the filtered voltage from the filter 142 and steps it up or down as described below. It is noted that the current output from the filter 142 is substantially in phase with the voltage output from the filter 142 when a load is present. The decision circuit 148 monitors the voltage output from the filter 144 to determine whether the DC to DC converter 144 needs to step the output current up or down. For example, the decision circuit 148 may analyze the AC component of the filtered signal to determine whether a balancing circuit 150 needs to balance the current.

The decision circuit 148 has an output that is connected to the balancing circuit 150. The balancing circuit 150 has an output that is connected to the DC to DC converter 144 so that the balancing circuit 150 controls the level to which the current output from the filter 142 is stepped up or down or is otherwise adjusted by the DC to DC converter 144. For example, the DC to DC converter 144 may attenuate or amplify the DC component of the current output from the filter 142. The balancing circuit 150 may be digital circuits, software, firmware, or other devices that analyze the output of the voltage analyzer 148 and cause the DC to DC converter 144 to adjust the output voltage, which will inherently adjust the output current, based on the input from the balancing circuit 150.

Figure 5:
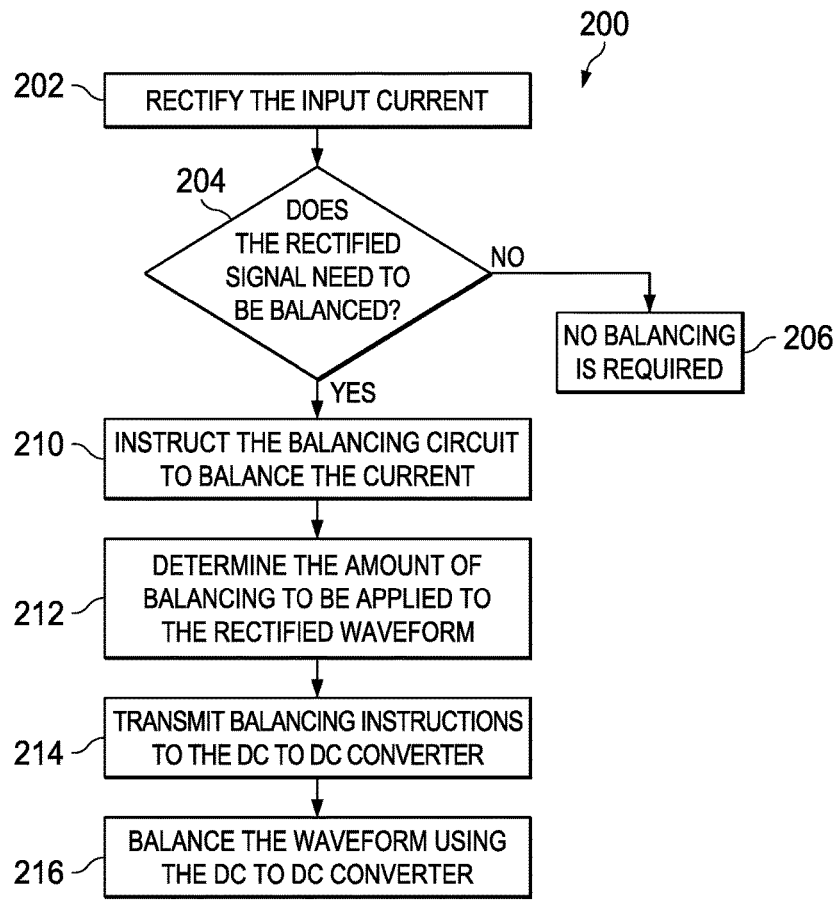
FIG. 5 is a flow chart describing the operation of the LED driver of FIG. 4
Figure 6:
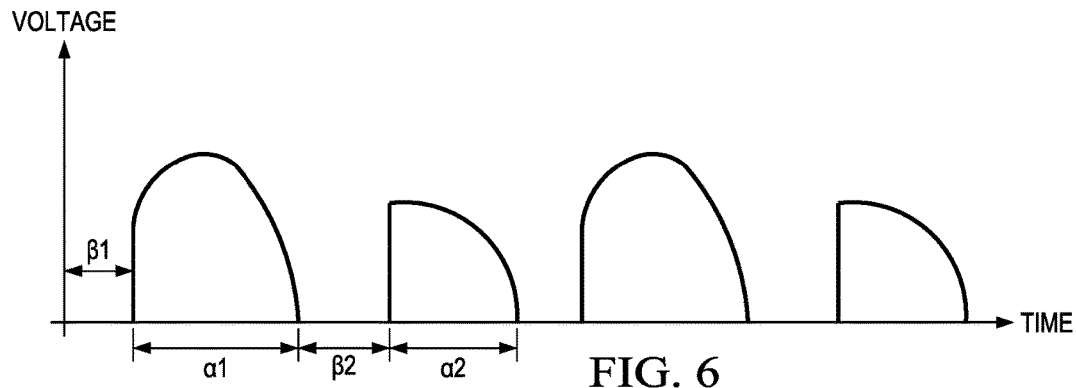
FIG. 6 is a graph of the rectified voltage input to DC to DC converter of FIG. 4.

Having described the LED driver 130, its operation will now be described with additional reference to the flowchart 200 of FIG. 5. The current shown in FIG. 3 is present at the bulb 106 and at the input of the full wave rectifier 140. The full wave rectifier 140 rectifies the input current in a conventional manner as described in step 202 of the flow chart 200. The full wave rectifier 140 outputs a signal as shown in FIG. 6, which is the rectified signal of two cycles from the line voltage 112. As shown, there is a higher and longer voltage during the conduction angle α1 than during the conduction angle α2.

Figure 7:
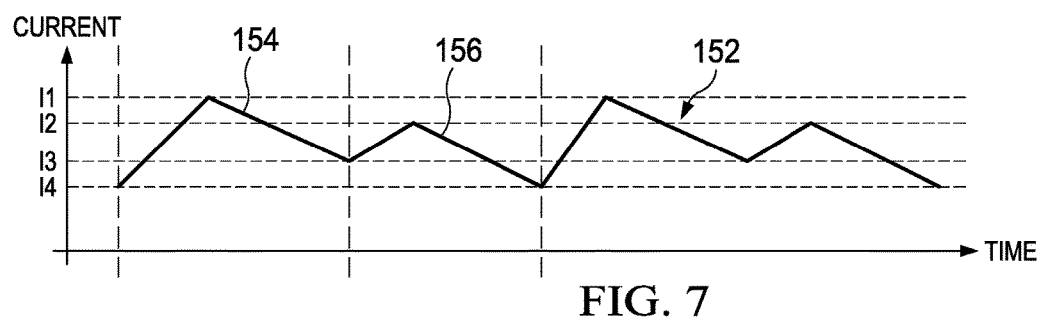
FIG. 7 is a graph showing the current at the output of the filter of FIG. 4.

The signal of FIG. 6 is filtered by the filter 142 to yield a signal 152 as shown in FIG. 7. The signal 152 has a first cycle 154 that is the result of the conduction angle α1 and a second cycle 156 that is a result of the conduction angle α2. The cycle 154 resulting from the conduction angle α1 peaks at a current I1 or may be referred to as having an amplitude of I1. The cycle 156 resulting from the conduction angle α2 peaks at a current I2 or may be referred to as having an amplitude I2 wherein the current I1 is greater than the current I2. The cycle 154 drops to a current I3 and the cycle 156 drops to a current I4, wherein the current I3 is greater than the current I4. In addition, the cycle 154 is longer than the cycle 156. The points represented by the currents I3 and I4 are sometimes referred to as troughs. For reference purposes, these points may be referenced as or related to amplitudes of the cycles 154, 156 in some circumstances herein.

The decision circuit 148 monitors the waveform 152 to determine if it is required to be balanced as described in the decision block 204 of the flowchart 200. For example, the decision circuit 148 may compare the peak current I1 to the peak current I2. The measuring may be accomplished by measuring a first peak current and then searching for the next peak and measuring it. By such measurement, the current values of two adjacent peaks are measured. If the difference is not greater than a predetermined value, the resulting flicker output from the LEDs 108, FIG. 1, may not be noticeable and no balancing may be performed as shown in block 206. If the difference is greater than a predetermined value, the decision circuit 148 may instruct the balancing circuit 148 to balance the current as shown in block 210.

In the embodiment described herein, the waveform 152 is out of balance because the peak current I1 of the cycle 154 is not within a predetermined value of the peak current I2 of the cycle 156. If such a waveform was used to drive the LEDs 108, the LEDs 108 would flicker to where the flicker could be noticeable to a user. As shown, the flicker would occur at the same frequency as the frequency of the line voltage 112. Therefore, if the line voltage 112 operates at a frequency of 60 Hz, the flicker from the rectified and dimmed signal would also have a frequency of 60 Hz, which may be noticeable by the user, especially if the LEDs 108 are operating in dim conditions. In bright conditions, phosphor and other chemicals in the LEDs 108 may glow for a short period after current to the LEDs 108 is removed. This glow will reduce the noticeable flicker in the light. However, the glow will not be achieved in dim lighting conditions, which makes the flicker in dim conditions more noticeable.

Balancing the waveform 152 involves determining the amount of adjusting that is required to be applied to the waveform 152 as described at step 212. The balancing involves measuring or analyzing the waveform 152 at the output of the filter 142, which may be performed by the decision circuit 148. The decision circuit 148 may determine the currents of the peaks and troughs in the waveform 152 and their location in time. This information is transmitted to the balancing circuit 150, which determines how to balance the waveform 152. For example, the peak current I1 of the cycle 154 may be lowered to the level of the peak current I2 of the cycle 156. The waveforms 154, 156 may also be adjusted to be the same length.

Information or control signals for achieving the balancing of the waveform 152 are transmitted to the DC to DC converter 144 as described in step 214. The instructions cause the DC to DC converter 144 to balance the waveform 152 as described in step 216. The instructions may cause the DC to DC converter 144 to lower the output current during periods corresponding to the conduction angle α1. Accordingly, the peak current during the conduction angle α1 may be lowered to the current level I2, which corresponds to the peak current during the period of the conduction angle α2. For example, the DC to DC converter 144 may attenuate or amplify the DC component of the waveform 152.

Figure 8:
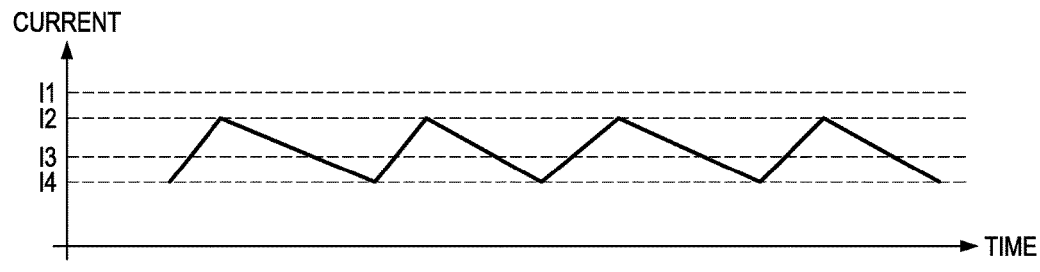
FIG. 8 is a graph showing the current at the output of the DC to DC converter of FIG. 4.

The result of the balancing is that the waveform 152 is converted to the waveform 160 shown in FIG. 8. As shown, the peak currents are the same, which reduces the flicker that would otherwise occur at the frequency of the line voltage 112. The waveform 160 has a ripple, but it is balanced. Therefore, any flicker emitted by the LEDs 108, FIG. 1, will flicker at a frequency of twice the frequency of the line voltage 112. For example, if the line voltage is operating at a frequency of 60 Hz, the flicker emitted by the LEDs 108 will be at a frequency of 120 Hz, which is less noticeable than a flicker of 60 Hz.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A light emitting diode driver circuit receiving a sinusoidal line voltage with a positive phase and a negative phase, in the positive phase voltage occurs during a conduction angle a1 and does not occur during an angle b1, in the negative phase voltage occurs during a conduction angle a2 and does not occur during an angle b2, the angles a1 and b1 equal 180 degrees, and the angles a2 and b2 equal 180 degrees, the conduction angles a1 and a2 are different from one another, the circuit comprising:
   (a) a rectifier circuit having inputs receiving the sinusoidal line voltage and outputs providing rectified voltage signals of the received sinusoidal line voltage, the rectified voltage signals having different voltage amplitudes and different durations during conduction angles a1 and a2;
   (b) a filter having inputs coupled to the rectifier circuit outputs and outputs providing output current signals of alternating current troughs and peaks for conduction angles a1 and a2, the currents of the conduction angles a1 having current peak amplitudes different from the current peak amplitudes of the conduction angles a2, and the currents of the conduction angle a1 having time lengths from trough to peak different from the time lengths from trough to peak of the currents of the conduction angles a2; and
   (c) converter circuitry having inputs coupled to the filter outputs and having current outputs providing balanced amplitudes of the current peaks of the phase angles a1 and a2 to be within a predetermined value in response to a balancing input.

2. The light emitting diode driver circuit of claim 1 including:
   a decision circuit having an input coupled to an output of the filter and having a decision output; and
   a balancing circuit having a decision input coupled to the decision output and a balancing output coupled to the balancing input.

3. The light emitting diode driver circuit of claim 1 in which the rectifier circuit includes a full wave rectifier circuit having outputs coupled to the inputs of the filter.

4. The light emitting diode driver circuit of claim 1 in which the filter includes an inductor connected in series between a filter input and a filter output and a capacitor coupled across the filter inputs.

5. The light emitting diode driver circuit of claim 1 including light emitting diodes coupled to the outputs of the converter circuitry and a bulb enclosing the light emitting driver circuit and the light emitting diodes.

6. The light emitting diode driver circuit of claim 1 including a dimmer circuit providing the sinusoidal line voltage with a positive phase and a negative phase.

7. A process of operating a light emitting diode driver circuit comprising:
   (a) rectifying a received sinusoidal line voltage to provide rectified voltage signals, the sinusoidal line voltage having a positive phase and a negative phase, in the positive phase voltage occurs during a conduction angle a1 and does not occur during an angle b1, in the negative phase voltage occurs during a conduction angle a2 and does not occur during an angle b2, the angles a1 and b1 equal 180 degrees, and the angles a2 and b2 equal 180 degrees, the conduction angles a1 and a2 are different from one another, the rectified voltage signals having different voltage amplitudes and different durations during conduction angles a1 and a2;
   (b) filtering the rectified voltage signals to provide filtered output current signals of alternating current troughs and peaks for conduction angles a1 and a2, the currents of the conduction angles a1 having current peak amplitudes different from the current peak amplitudes of the conduction angles a2, and the currents of the conduction angle a1 having time lengths from trough to peak different from the time lengths from trough to peak of the currents of the conduction angles a2; and
   (c) converting the filtered output currents to converted current outputs in response to a balancing input, the converted current outputs having balanced amplitudes of the current peaks of the phase angles a1 and a2 to be within a predetermined value.

8. The process of claim 7 including:
   measuring a first amplitude of a filtered current first peak and then measuring a second amplitude of a filtered current next peak;
   if the difference between the first amplitude and the second amplitude is greater than the predetermined value, instructing the converting on the balancing input to balance the converted current outputs.

9. The process of claim 7 including:
   measuring a first amplitude of a filtered current first peak and then measuring a second amplitude of a filtered current next peak;
   if the difference between the first amplitude and the second amplitude is not greater than the predetermined value, instructing the converting on the balancing input to maintain the converted current outputs.

10. The process of claim 7 including providing the converted current outputs to light emitting diodes.

11. The process of claim 7 including receiving the sinusoidal line voltage from a dimmer circuit.

* * * * *